(12) United States Patent
vor dem Esche et al.

(10) Patent No.: US 10,020,654 B2
(45) Date of Patent: Jul. 10, 2018

(54) ENERGY STORAGE INSTALLATION

(71) Applicant: ENRICHMENT TECHNOLOGY COMPANY LTD., Jülich (DE)

(72) Inventors: Rainer vor dem Esche, Heinsberg (DE); Christoph Schäfer, Aachen (DE); Christoph Treppmann, Aachen (DE)

(73) Assignee: ENRICHMENT TECHNOLOGY COMPANY LTD. (DE)

( * ) Notice: Subject to any disclaimer, the term of this patent is extended or adjusted under 35 U.S.C. 154(b) by 613 days.

(21) Appl. No.: 14/430,445

(22) PCT Filed: Aug. 30, 2013

(86) PCT No.: PCT/EP2013/067966
§ 371 (c)(1),
(2) Date: Jul. 17, 2015

(87) PCT Pub. No.: WO2014/048673
PCT Pub. Date: Apr. 3, 2014

(65) Prior Publication Data
US 2015/0311717 A1  Oct. 29, 2015

(30) Foreign Application Priority Data

Sep. 28, 2012 (EP) .................................. 12186472

(51) Int. Cl.
*H02J 1/10* (2006.01)
*H02J 3/06* (2006.01)
(Continued)

(52) U.S. Cl.
CPC .................. *H02J 3/14* (2013.01); *H02J 3/30* (2013.01); *Y02E 60/16* (2013.01)

(58) Field of Classification Search
CPC ................ H02J 3/14; H02J 3/30; Y02E 60/16
(Continued)

(56) References Cited

U.S. PATENT DOCUMENTS 8,008,804 B2   8/2011 Capp et al.
2004/0263116 A1  12/2004 Doruk et al.
(Continued)

FOREIGN PATENT DOCUMENTS

DE  10 2009 043 380 A1  4/2011
EP       1 523 119 A2    4/2005
(Continued)

OTHER PUBLICATIONS

International Search Report for corresponding PCT/EP2013/067966, completed Jul. 14, 2014 by C. Gatzert of the EPO.
(Continued)

*Primary Examiner* — Carlos Amaya
(74) *Attorney, Agent, or Firm* — Tarolli, Sundheim, Covell & Tummino LLP

(57) ABSTRACT

An energy storage system is provided that is adapted to simultaneously carry out control and system tasks in non-local and local power supply grids and to a method for operating such an energy supply system. The energy storage system comprises at least one energy storage module and a system storage capacity and system output, wherein the energy storage system is at least intended for connection to a non-local power supply grid for the execution of received, non-localized control and system tasks in the non-local power supply grid and for connection to one or more local power supply grids for the execution of received, localized control and system tasks in the local power supply grid(s), and is adapted to be connected to a communication network via at least one interface and to receive at least the non-localized control and system tasks via the communication network.

18 Claims, 5 Drawing Sheets

Figure 1:
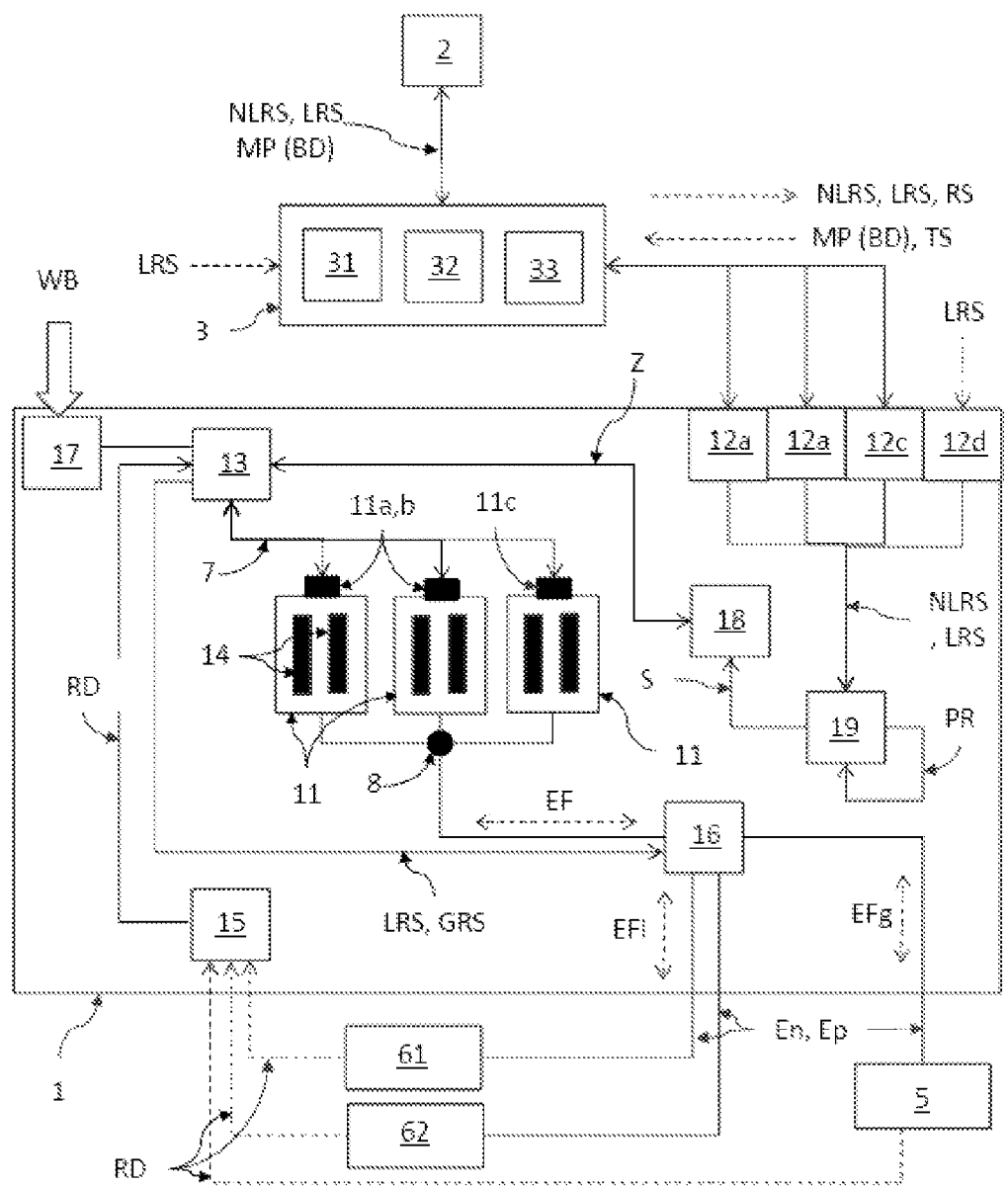

(51) Int. Cl.
*H02J 3/46* (2006.01)
*H02J 3/14* (2006.01)
*H02J 3/30* (2006.01)

(58) Field of Classification Search
USPC .......................................................... 307/20
See application file for complete search history.

(56) References Cited

U.S. PATENT DOCUMENTS

2008/0219171 A1    9/2008  Gopalakrishna et al.
2013/0270914 A1*  10/2013  Veltri ....................... H02J 3/30
                                                           307/68

FOREIGN PATENT DOCUMENTS

EP              2 495 800 A      9/2012
WO     WO 2012/036799 A1        3/2012

OTHER PUBLICATIONS

Uslar, et al.: *What is the CIM Lacking?* Innovative Smart Grid Technologies Conference Europe (ISGT Europe), 2010 IEEE PES, IEEE, Piscataway, NJ, USA, Oct. 11, 2010, pp. 1-8, XP03180329, ISBN: 978-1-4244-8508-6 (entire document).

* cited by examiner

ENERGY STORAGE INSTALLATION

RELATED APPLICATIONS

The present invention is a U.S. National Stage under 35 USC 371 patent application, claiming priority to Serial No. PCT/EP2013/067966, filed on 30 Aug. 2013; which claims priority from EP 12186472.2, filed 28 Sep. 2012, the entirety of both of which are incorporated herein by reference.

FIELD OF THE INVENTION

The invention relates to an energy storage system that is adapted to simultaneously carry out control and system tasks in non-local and local power supply grids and to a method for operating such an energy supply system.

BACKGROUND OF THE INVENTION

The energy for operating a power supply grid is supplied by various and different types of power stations. Herein, most of the power stations, such as nuclear power stations, coal-fired power stations, gas-fired power stations, wind turbines, biogas plants, or solar power plants, are nothing but energy generators for feeding energy into the non-local power supply grid. For example, non-local power supply grids are distribution networks and transmission networks, such as they are operated in Germany by Amprion, 50 Hertz, Tennet, and TransnetEnBW. These transmission networks are a part of the wide area synchronous grid in Europe. In their capacity as mere energy generators, the power stations mentioned above cannot take up any extra energy from the network and store it in case of need. In contrast, energy storage systems can be used to collect energy from and release it to a power supply grid. For example, energy storage systems are central energy storage systems, such as pumped storage power stations, or decentralized energy storage systems, such as battery storage devices or flywheel energy storage units. Pumped storage power stations are energy storage systems that are largely not subject to changes in weather and, as a general rule, are therefore always available. Usually, central energy storage systems are designed for a large capacity. Due to the available capacity, such systems are adapted to provide reserve energy for the non-local power supply grid in order to take appropriate effect in the non-local power supply grid. Depending on their overall size, pumped storage power stations may have a capacity of several 100 MW and more wherein, however, the generators are, in most cases, designed to produce electric current under full load and can therefore utilize the full capacity of the pumped storage power station at an appropriate efficiency and in a timely manner. This operating method is not adapted to stabilize or improve the quality of a small local power supply grid having a demand for electricity that is rather negligible as compared with the capacity of the pumped storage power station.

Centrally used battery storage devices are currently under construction with the objective to put into practice a pilot operating method for grid-stabilizing (non-localized) tasks (reserve energy). However, the devices that have been planned so far do not fulfill any localized tasks. Due to their immanent relationships between output, capacity and aging, however, battery storage devices are, as a matter of principle, not very well suited for such applications with a plurality of load cycles per day and degrade rapidly because of temperature influences, system failures and operating errors. For this reason, battery storage devices require highly intensive maintenance. Due to their high fire and chemical risks, battery storage devices additionally present an environmental and/or water hazard and are highly complex in terms of protection and security.

In general, decentralized energy storage systems are optimized for stabilizing the local demand for electricity and are neither designed nor qualified for delivering reserve energy to support the non-local power supply grid. An interconnection of the decentralized storage systems to form a system that is operated both locally and non-locally has not been achieved so far.

It would therefore be desirable to have an effective energy storage system available, which enables a simultaneously improvement of local network quality and security of supply for non-local power supply grids and thus can thus be used as an energy storage system which is sufficiently effective for both purposes.

SUMMARY OF THE INVENTION

It is an object of the present invention to provide an effective energy storage system, with a simultaneous improvement of local network quality and facilitates the security of supply by non-local power supply grids.

This problem is solved by an energy storage system with at least one energy storage module and a plant storage capacity and plant power for receiving and supplying energy into the power supply grids connected to the energy storage system, wherein the energy storage system is provided for at least one connection to a non-local power supply grid for the implementation of received, non-localized control and system tasks in the non-local power supply grid and for one connection to one or more local power supply grids to execute received localized control and system tasks in the local power supply grid or systems and is adapted for connection to a communication network via at least one interface and to receive at least the non-localized control and system tasks via the communication network, and comprises a control unit configured to control the receiving and supplying of energy from or to the connected power supply grids according to the localized and non-localized control and system tasks simultaneously for all connected networks, wherein the control unit is adapted to control the non-localized control and system tasks only in the scope of the portions of the system storage capacities and/or the system output, which are not required for localized control and system tasks.

By using the energy storage system as a decentralized intermediate storage system featuring the respective connections to local and/or non-local power supply grids, the local network quality can be improved by localized control and system tasks on site and, at the same time, positive energy (fed into the network) or negative energy (energy collected from the network) is provided to the non-localized power supply grid for power supply grid regulation in order to carry out non-localized control and system tasks. By simultaneously carrying out localized and non-localized tasks and by simultaneously controlling all connected power supply grids in an appropriate manner, the requirements in the connected local and non-local power supply grids can be met simultaneously and efficiently. Furthermore, the system storage capacity and the system output can be effectively utilized based on the combination of localized and non-localized requirements (effective energy storage system), thereby helping to save resources. Herein, the energy storage system can either be directly connected to a non-local power supply grid or to each of one or more local power supply grids, or the energy storage system can indirectly be connected to a non-local power supply grid via a connected local power supply grid, provided that the local power supply grid is a part of the non-local power supply grid, i.e., is connected to the non-local power supply grid. Localized control and system tasks include ensuring the required local power voltage, the reactive power compensation by control of amplitude and phase position of the voltage signal, provision of a local output reserve for possibly activating larger power consumers or activation current peaks, and storage of local excess energy amounts. Non-localized control and system tasks include the provision of primary or secondary regulating output. The regulating output (also reserve output) ensures supply of power customers with just the required electrical output at unforeseen events in the power supply grid. To achieve this, the output of power stations that are capable of producing reserve power can be adjusted for a short time, or rapidly starting energy storage systems, such as the energy storage system according to the invention, can be used. The primary regulating output is used to compensate for imbalances between the physical output offer and output demand with the target of restoring a stable line frequency. The secondary reserve power is intended to restore the balance between the physical electricity offered and the electricity demanded after a difference has occurred wherein, in contrast to the primary reserve power, nothing but the situation in the particular control zone including the exchange of electricity with other control zones is under consideration. Further non-localized control and system tasks include the provision of energy storage systems to support a black start, the general storage of output peaks, and reactive power compensation for increase of the transmission output in a non-local power supply grid. Further localized or non-localized control and system tasks for local and/or non-local power supply grids are the provision of redundancy (fail-safe operation) of power supply in combination with the already existing energy suppliers, and reactive power management.

Herein, the non-local power supply grid designates a power supply grid which extends over very large areas in a regional or supraregional manner and in which the non-localized control and system tasks are carried out. Non-local power supply grids are, for example, transmission or distribution networks (public power supply grid). The public power supply grid in Germany, for example, consists of four transmission networks and several distribution networks. The transmission networks, for example, are operated by the network operators Amprion, 50 Hertz, Tennet and TransnetzEnBW. Together, the four transmission networks form the Netzregelverbund for Germany (cooperation in terms of control power). In other countries, appropriate transmission networks are operated by other network operators. In the transmission networks, the frequency of the power supply grid is maintained at a stable value (frequency control). The superordinate wide area synchronous grid in Europe that is composed of the respective transmission networks in the individual states must also be considered to be a non-local power supply grid for which, however, only the standards for the reserve power are defined at the moment. The non-localized control and system tasks are performed in the respective transmission networks. Local power supply grid in the sense of the invention are the power supply systems in which the localized control and system tasks described above are performed. Local power supply grids are usually strongly spatially limited, e.g. an operating-internal power supply systems on an operating facility or a network within a building or building complex.

The term "receive" is understood to mean any type of activity in which data are transmitted to the energy storage system. This transfer can take place via the communication network, for which the energy storage system comprises one or more corresponding interfaces. However, the data can be received (for example, from a USB data stick) via another interface of the energy storage plant from a data carrier by reading in a corresponding disk drive (such as a CD-ROM) or a disk interface. Alternatively, the data can also be received by direct input via a corresponding user interface (screen and keyboard). The data to be received, for example, are the localized and/or non-localized control and system tasks.

In one embodiment, the energy storage system is, here, connected to a non-local power supply grid and to one or more local power supply networks. Here, the localized and non-localized control and system tasks in the respective connected power supply grids are carried out separately. In a further embodiment, the energy storage system is only connected to one or more local power supply grids at least one of which is connected to the non-local power supply grid. In this case, the localized control and system tasks are carried out in the respective local power supply grids, while the non-localized control and system tasks are carried out in the non-local power supply grid via the connected local power supply grid that is connected to the non-local power supply grid. In certain operating states, for example, in the event of a failure of one or more power supply grids, an energy storage system can also be completely disconnected from the non-local power supply network for safety reasons. This disconnection may, for example, be limited in time. The same can also apply to the local power supply grid(s).

The energy storage system according to the invention can be any suitable energy storage system that is able to perform not only the localized control and system tasks but also non-localized control and system tasks in non-local networks via the provision of primary or secondary regulating output based on its storage properties and storage parameters. Suitable energy storage systems include local (non-central) compressed air accumulators or hydrogen accumulators in combination with fuel cells, battery systems or kinematic energy storages such as flywheel energy accumulators. Therein, the energy storage system can comprise only a single energy storage module or more than one energy storage modules. An energy storage module is understood to mean the functional unit that can supply energy to or receive energy from the energy storage system. In one embodiment, the energy storage module comprises one or more flywheel energy storage units for reversible storage of energy within the energy storage system. This storage is referred to as reversible, since the energy stored as rotational energy can be tapped from the flywheel energy storage system as needed and fed as electrical energy from the energy storage plant into a power supply grid and tapped in the reverse case as electrical energy from the power supply grid and mechanically stored in the energy storage system in form of rotational energy in the flywheel energy storage systems. Flywheel energy storage systems have the advantage that they can very variably receive and supply quantities of energy in short response time and accurately supply the energy to consumers and store this energy in the form of mechanical energy. Thus, flywheel energy accumulators are a much lower danger potential in case of fire than, e.g., larger collections of batteries, combined into a battery energy storage system or hydrogen accumulators with hydrogen tanks and flammable hydrogen as a danger potential. Although, in contrast, non-combustible gases can be used for storing energy in compressed air reservoirs, compressed air tanks nevertheless pose a potential explosion hazard because of the high pressure in the compressed air tanks. If used as energy storage systems, flywheel energy storage units therefore represent an energy provision technology that is environmentally safer than other storage technologies and are well suited for any number of load cycles per day desired. Energy provision is referred to as negative energy provision when energy is collected from the power supply grid and is stored in the flywheel energy storage unit in the form of mechanical rotational energy. Accordingly, energy provision is referred to as positive energy provision when energy that is stored in the flywheel energy storage unit in the form of mechanical rotational energy is fed into the power supply grid by decelerating the flywheels (or rotors). Herein, the capability of flywheel energy storage units to provide energy within a few milliseconds is just as advantageous as the capability to provide the specified power over a period of a plurality of minutes.

The energy storage plant can be manufactured in a modular manner of one or more energy storage modules, each with one or more flywheel energy storage systems. Due to the modular design, both the storage capacity of the energy storage system and the power can be adapted to the need and optionally expanded significantly. In the case of a modular design with more than one energy storage modules in a local energy storage system, these modules are connected via a common blending-in point as an entity with the connected power supply grids via suitable components within the energy storage system. In one embodiment, the energy storage system comprises several energy storage modules, of which each energy storage module may comprise a module control unit for executing tasks assigned by the control unit within the localized and non-localized control and system tasks via corresponding data connections to the individual energy storage modules. The module control unit can be carried out like the control unit of the energy storage system, but could also be carried out in a simple manner and with a smaller or without data storage due to its functionality limited to the energy storage modules. The connection of the local energy storage system to the non-local power supply grid and to each of one or more local power supply grids can be configured by a person skilled in the art in a suitable manner, wherein the connection is designed such that the power supply grids (non-local and local) can be independently supplied with energy from the energy storage system or energy can be taken from the power supply grids.

The control unit designates a component in the energy storage system that controls the energy storage system, i.e., that sets the desired operating conditions and operating parameters and that controls the energy storage system according to an operating plan that contains the desired operating conditions as a function of time. The operating plan is at least based on the localized control and system tasks that include or can include non-localized control and system tasks. Furthermore, the control unit is able to appropriately respond to changing conditions in the local power supply grid and to increase or keep constant the quality of the local power supply grid by feeding or collecting energy or to re-improve the quality of the local power supply grid in the event of a failure in the latter. The localized and non-localized control and system tasks from external systems can in this case be transmitted to the energy storage system via the communication network and thus received by the energy storage system. External systems here, for example, are control systems of the local power supply grid for localized control and system tasks and/or control systems of the non-local power supply grid, a superordinate interconnection control or local measuring points for localized and/or non-localized control and system tasks. Alternatively, the external systems can be symbolic for instructions received from the energy storage system by the operators of the local and/or non-local power supply grids. The instructions that are received correspond to the localized and/or non-localized control and system tasks for the energy storage system. In addition to the control and system tasks in the local power supply grid, the control unit can receive commands, instructions, etc. from an external (non-local) control unit for the non-local power supply grid and run these commands or instructions in parallel to the localized control and system tasks. Herein, the term "run" refers to the control unit controlling the energy storage system according to the present localized and non-localized control and system tasks for the connected power supply grids. Therein, the external (non-local) control unit regulates the demand for the reserve power for the non-local power supply grid and can request this demand from the energy storage system via the communication network within the scope of free capacities (not required for localized control and system tasks) of the energy storage systems in the form of non-localized control and system tasks. Further external systems from which the energy storage system may receive non-localized control and system tasks, for example, are a power support interconnection or a power exchange by means of which feeds or energy supplying in certain operating times are correspondingly cost effective. Further external variables for non-localized control and system tasks are, for example, the demand for reactive power, a peak load compensation, or local storage demand required in the non-local power supply grid.

Here, the control unit is connected with the external control unit via the energy storage system with at least one interface via the communication network. The communication network can be configured in a suitable manner. For example, the communication network is a radio-based network, a mobile phone network, a high-availability connection or a network according to IECG. Alternatively, the communication network may be configured as a wired telephone network or via a computer network (e.g. the Internet). The communication network may also comprise more than one different types of networks (sub-communication networks). In an embodiment, the energy storage system comprises several interfaces to sub-communication networks in the communication network and in case of interrupted connection, it is designed to reconnect via an existing alternative sub-communication network in the existing communication network. Due to the existence of several sub-communication networks in the communication network, the risk of failure of the entire communication network is significantly reduced, since in case of failure of a network type, alternative types of networks are available for uninterrupted communication to the control unit. The redundancy in the communication network permits receipt of a possibly important upgrade of the non-localized control and system tasks via the alternative sub-communication network. Therein, possible sub-communication networks are radio-based, cable-based or current-based communication networks, for example via the mobile network, via the Internet, via the standard phone network or via a data connection using the power cable in the power supply grid.

In one embodiment, the energy storage system is intended to periodically transmit a test signal and receive a corresponding return signal via the communication network, wherein the receiving of the return signal confirms the existing connection to the communication network. For example, such a test signal is a so-called digital handshake which is used to verify whether or not the communication connection exists. To achieve this, the control unit sends out a data packet to an external connected system and receives back in response a corresponding data packet (feedback) via the communication network. The control unit records both the transmission and the received feedback and stores this to a suitable data memory, for example, to a server. Alternatively, the above-described digital handshake can also be initiated by an external system via the communication network. In this way, it is determined at any time whether communication is possible with the control unit to receive non-localized control and system tasks. in this respect, an interrupted communication cannot be misunderstood as lack of update of the non-localized control and system tasks with a corresponding continuation of the last control and system task. Therefore, in a further embodiment, the energy storage system is provided for a non-existent connection to the communication network to exclusively implement the localized control and system tasks for the respective local power supply grid(s). In case of interrupted communication, another control and system task might be necessary. Therefore, the local control unit is limited to localized control and system tasks when communication is interrupted. The preference of localized control and system tasks in case of interrupted communication with the central control unit is advantageous because after a failure of communication to the external system, the control unit no longer receives any feedback about the current state of the non-local power supply grid. If the control unit simply executes the tasks at hand without receiving further feedback, this could under special circumstances even result in a failure of the power supply grid due to overload. Therefore, it is advantageous in the event of faulty communication to external systems to perform only the localized control and system tasks, where the energy storage system is required and can monitor the appropriateness of these localized tasks if necessary via their own measurement units. If necessary, the localized tasks can be initiated on site by changing the task memory. This is not possible for the non-local power supply grid because the demands of the non-local power supply grid also depend on the intervention on the part of other power stations, consumer systems or storage systems, an overview of which is only available to an external control unit.

In an embodiment, multiple energy storage systems according to the invention can be disposed at different positions on the same non-local power supply grid and on respectively different local power supply grids. The spatially different positions permit distribution of energy storage systems over larger areas or regions, so that a non-local supply of energy to the non-local power supply grid can also take place locally. In contrast, the energy provided by a large pumped storage plant, for example, would have to be transported over long distances, where appropriate, in the non-local power supply grid to the consumer. In a geographically decentralized installation of energy storage systems, at least a portion of the required energy can be fed to the non-local power supply grids close to the customer.

In one embodiment, the energy storage system comprises one or more measurement units for measuring one or more relevant data in the respectively connected local power supply grid and the control unit is adapted to control the energy storage system for localized control and system tasks in this local power supply grid based on the measured relevant data. The measurement units may be integrated in the local power supply grid or disposed at one or more locations at the local power supply grid. The measuring units can also be arranged at the connection point between the energy storage system and the local power supply grid. Units of measurement in the present invention are, for example, probes for measuring the line frequency and line voltage as an example of relevant data for the connected local power supply grid Further measuring variables are, for example, the voltage curve as a function of time, the phase angle, the neutral point, the line frequency, the line current and other variables. Those skilled in the art can select appropriate units of measurement or measurement probes in the scope of the present invention and arrange them at the appropriate position. If, for example, the desired line frequency is 50 Hz and the measuring units detect a decrease in the line frequency, the controller automatically feeds energy into the local power supply grid (localized control and system task) based on the currently measured line frequency (measured as relevant data) and a reaction sequence stored in the control unit, until the line frequency has reached the desired value again. Further examples include the measurement of the phase angle in the local system to provide the appropriate reactive power compensation or the voltage measurement in case of too much or too low load consumption in the local power supply grid to maintain voltage quality. For other control and system tasks, other corresponding reaction sequences are stored in the local control unit.

In a further embodiment, the energy storage system is connected via one or more control unit(s) to one or more local power supply grids and to the non-local power supply grid, wherein the control unit(s) is/are configured to regulate a flow of energy between the connected power supply grids and the energy storage system. If the local and non-local power supply grids were only connected to the connection point of the energy storage system, the energy fed in by the energy storage system would only be fed into the power supply grid that has the bigger demand for energy. In this manner, however, specific local and non-local regulation according to a distribution of tasks would no longer be possible. Current energy storage systems are typically connected to a single power supply grid via a switch. Here, the above control of the flow of energy would be omitted and the switch would need only to be opened when the power fails. In the present invention, however, / the control unit(s) is/are equipped such that, after power supply grid has been disconnected, the other connected power supply grids may continue to be supplied with energy as desired or this energy can be taken from these power supply grids, since the energy storage system in the context of the present invention has to supply more than one separated power supply grids at the same time. The regulating unit controls the flow of energy to the connected networks in the manner prescribed by the controller. In a preferred embodiment, the regulating unit is furthermore arranged to disconnect one or more of the connected power supply grids from the energy storage system in case of need. If one of the connected power supply grids fails, the regulating unit immediately separates this power supply grid under certain circumstances within a few milliseconds from the energy storage system so that it remains operational for the other systems. Otherwise, a short circuit or an overload situation would occur under certain circumstances. In a further embodiment, the regulating unit comprises for this purpose a regulating box having at least one control element and one or more circuit breakers, which are controlled by the control element and whose number depends on the number of power supply grids connected to the regulating unit. Therein, the regulating box is connected to the control unit via a data line, either directly or through the regulating unit, wherein the control unit can transfer the configuration data of the regulating function to the control element.

In a further embodiment, the energy storage system comprises a task memory for storing the received non-local and localized control and system tasks accessed by the control unit for controlling the energy storage systems according to the non-local and localized control or system tasks. The task memory may be a suitable data storage in the energy storage system. It can be designed as part of the control unit or as a separate memory. In both cases, the control unit is connected to the task memory via a data connection such that it can access the task memory at any time, read out the stored non-localized and localized control and system tasks stored therein and control the energy storage system according to these tasks. Within the scope of the present invention, the person skilled in the art can configure the circuit-related access of the control unit to the task memory and the energy storage modules of the energy storage system to be activated in an appropriate manner. The instructions regarding the non-localized and localized control and system tasks can be stored in the task memory, for example, as rule "memory from the non-local power supply grid xx kWh on day y.beginning at zz hours". In another example, the instructions in the memory task could be: "feed xx kW per hour into the local power supply grid beginning at zz hours today." The person skilled in the art can select the specific data format of the instructions within the scope of the present invention in an appropriate manner. These instructions (or tasks) in the task memory can, for example, involve a reserve power or the stabilization of a voltage or electric current. The instructions (or tasks) can thereby be saved with or without time reference. An instruction (or task) without any time reference may, for example, read "deliver the corresponding reserve power depending on the line frequency deviation of 50 Hz according to a specified curve".

In one embodiment, the energy storage system comprises a test unit, which is intended to verify the received non-localized and localized control and system tasks for plausibility and origin before storing them in the task memory, and storage in the task memory only takes place in case of a positive test result. This prevents unauthorized access to the plant core, i.e., to the control unit. This contributes to the operational safety of the energy storage system towards the outside world and to the security of energy supplies. In case of the received non-localized and localized control and system tasks, the origin can, for example, be part of the received data packet and be read accordingly by the test unit and compared with the expected data structure of the origin. Herein, the origin can, for example, be transmitted as hash value which the test unit can compare with the hash values for allowed data sources for non-localized and localized control and system tasks, which it has available. The origin is verified to be allowed, if the available hash value is identical with the received hash value. The non-local and local system tasks could also be transmitted encrypted, whereby the decryption key for the relevant origin is characteristic. If the non-localized and localized control and system tasks are decrypted with a decryption key, this decryption key is characteristic for the origin of the received data. The plausibility of the received data can, for example, be verified by the fact that the localized and non-localized control and system tasks do not represent any tasks which would exceed the plant storage capacity and plant power of the energy storage system or include meaningless data in terms of data format. Therein, a plausibility check can include, for example, the calculation of a checksum, a data sum check and/or an encryption with subsequent successful decryption. In a preferred embodiment the test unit is adapted to send out an alarm signal to the control unit in case of a negative check result, and the control unit is adapted to disconnect the energy storage system from the connected power supply grids following the alarm signal. Thus, in case of an unauthorized attempt to access the energy storage system in the form of control and system tasks of unknown origin or suspicious content, the energy storage system is brought in a safe state by being switched off by disconnecting it from the system. In response to the alarm signal and the power separation, the control unit may try to establish a connection via the communication network to receive new non-localized and/or localized control and system tasks the origin and content of which are correct.

In a further embodiment, the control unit is designed to detect and evaluate operational data of the energy storage system, and to send a signaling protocol comprising the operating data via the communication network, so that at least the operating data for the non-localized control and system tasks to be received can be considered. For example, the operating data of the energy storage system show the available system capacity and system output and the (currently) free non-local capacity (the capacity that is not required for the localized control and system tasks) and the (currently) free non-local output (the system output that is not required for the localized control and system tasks) available in the local energy storage system for non-localized tasks and the localized control and system tasks planned for the future. Therein, the operating data can be measured by the control unit itself, or the control unit receives the operating data from operating sensors transmitted via corresponding data lines. The operating data gathered in this way are evaluated according to a scheme of the control unit stored in the control unit, for example, by an appropriate software program, and are then transmitted as operational data in a predetermined format via the interfaces already described above. The clock pulse for the transmissions is, for example, 1 Hz or less. The control unit detects, for example, the actual values of the energy module memory states or the memory states of the individual flywheel energy storage systems, the states of the connected power supply grids (e.g, voltage and current) and calculates these data to perform the local, non-localized and, where appropriate, regional control and system tasks. The reporting protocol can, for example, comprise not only the operating data but also the identity of the energy storage system in the form of a characteristic designation such as an identification number and, possibly, the location at which the energy storage system is set up in the form of geographic coordinates. Therein, the reporting protocol has a data format that is adapted to be received and processed by the desired external bodies. The transmitted operating data, including the information about the actual and planned data of free system storage capacities and free system output can be received by an external control unit and planned accordingly, finally corresponding system-specific non-localized control and system tasks are transmitted back to the energy storage system. In an energy storage system with a variety of local energy storage systems with a variety of free capacities and free outputs that may differ strongly for the individual energy storage systems depending on the overall capacity and overall output of the individual energy storage system and its tasks for the local power supply unit, the central control unit may very flexibly and quickly initiate capacities for infeed in the non-local power supply grid or for energy tapping from the non-local power supply grid via the corresponding instructions (submitted non-localized control and system tasks) to the local control units of the respective energy storage systems. Here, the external control unit can even assign locally different tasks to the control units of different inventive energy storage systems. For example, the external control unit may cause the control units of the energy storage systems that are also placed near a larger consumer and the positions of which are known to the external control unit, to feed in (emit) energy into the non-local power supply grid via the correspondingly submitted control and system tasks to support the non-local power supply grid near this consumer. In the same non-local power supply grid (or another non-local power supply grid), the external control unit may submit control and system tasks to tap energy from the non-local power supply grid to local control units of other energy storage systems that are geographically far distant from the above energy storage systems. Thus, the external control unit may assign the corresponding non-localized control and system tasks to the respective control units via corresponding individually adjusted submissions flexibly adjusted according to the regional situation at a variety of energy storage systems geographically placed in different positions.

In a further embodiment, the control unit is configured to provide the localized control and system tasks for controlling the respective energy storage system to take precedence over the non-localized control and system tasks in the non-local power supply grid. In case of a single energy storage system, the free capacity is either sufficient to fulfill the non-localized control and system tasks under normal conditions, or the additional capacity that is reserved for localized control and system tasks would not be sufficient as a potential reserve for solving the network problem in exceptional cases. In this respect, the priority of the localized control and system tasks is based on the limited system storage capacities and system outputs. If, however, more than one energy storage systems are connected to the non-local power supply grid, the demand for reserve power in the non-local power supply grid could also be met by other energy storage systems because, thus, a sufficient free system storage capacity and system output can be used without the localized control and system tasks having to be neglected or even ignored in exchange. 20 local systems each producing 1.6 MWh in the system network correspond to 32 MWh. Locally reserved are e.g. 1 MWh each. This results in an available capacity of 12 MWh for non-local tasks. Therein, simultaneous requirements for the provision of further power would have to be additionally considered and, if necessary, be taken into account.

In one embodiment, the energy storage system comprises one or more weather sensors for measuring local weather conditions and the control unit is provided, to control operating components of the energy storage system, depending on the weather conditions. Operating components are, for example, auxiliary equipment such as chillers, vacuum plants, etc. Such operating components are affected by weather. When temperatures are high outside, for example, a cooling unit must be operated with more power than at low outside temperatures. If the energy storage modules themselves provide the energy to operate the components, this must be considered when planning future non-localized and localized control and system tasks. A higher outside temperature would change the available system storage capacity and system power for tasks in the connected power supply grids. In this respect, measuring weather data enables a better anticipating and hence more effective use of the energy storage system.

In a further embodiment, the energy storage system is intended to form a regulating network with other energy storage systems that are provided as regulating network for joint control according to the non-localized control or system tasks in the non-localized power supply grid or according to regional control and system tasks, and that the energy storage system is equipped to communicate with the other energy storage systems to conduct common control. A regulating network here is the combination of several energy storage systems for shared reaction to needs in the non-local power supply grid. Through these interfaces, the energy storage systems receive current demand reports so that the task storage in the control units can always be kept up to date and the control units can react up to date at any time to the needs in the non-local and the local power supply grid with emission or taking up of energy to or from the local energy accumulators. In a preferred embodiment, the regulating network is intended to provide a black start support for the non-localized power supply grid, where the black start support has priority over the localized control and system tasks for the respectively connected local power supply grid(s). A black start is generally the startup of an energy supplier, e.g., a power station or energy storage, after a power failure, if this is done independently of the power supply grid. Black start capacity means the ability of such energy suppliers to start up independently of the power supply grid from the deactivated condition or to emit energy from an energy storage. This is particularly important at an area-comprehensive failure of the non-local power supply grid, to take the non-local power supply grid back into operation. The energy of black-start-capable power stations or energy storage systems can then be used to start up non-black-start-capable power stations or energy storage systems. For example, thermal power stations require a great amount of electrical energy before they can provide electrical or thermal power themselves. If a coal-fired or nuclear power station is provided with one or more black-start-capable local energy storage systems according to the invention with sufficient output, the overall system consisting of the power system and the energy storage system may also achieve black start capacity here.

In a further embodiment, the energy storage system is provided for use on the basis of local or regional impact data with other energy storage systems to form a regulating network and to provide it with additional or modified primary localized control and system tasks as regional control and system tasks. Local or regional influence data means, e.g., environmental data that influence the energy to be fed into a power supply grid, such as wind speed, sun intensity and sunshine duration or temperature; Further influence data may be local feed data from renewable energy systems. Based on such influence data, the energy amounts that are produced, e.g. in energy systems for use of regenerative energies as in wind power or solar power plants, can also be evaluated on short notice. If the local environmental data (influence data) change as compared to a former forecast, e.g. much more or much less energy may in fact be fed into the local or non-local power supply grid from such energy systems. Accordingly, regional networks according to the invention may also store any excess energy amounts and feed them into the local or non-local power supply grid at a later time. If a local power supply grid is fed, e.g., from such energy systems as wind power or solar power plants and if it is foreseeable from the influence data that these energy systems will provide less energy than planned, the respective local energy storage systems connected to the local power supply grid may provide missing energy to the local power supply grid. A regulating network here is the connection of several energy storage systems for shared reaction to needs in one or more local power supply grids. Energies for specific localized control and system tasks via the non-local power supply grid may also be moved to energy storage systems of this regulating network in a different geographical position. If, e.g., a energy storage system requires an energy infeed for its connected local power supply grid from its energy accumulator modules into this local power supply grid and if this energy storage system does not have the required energy for this stored in its storage modules, it may also receive this energy from any other energy storage system placed in a different location without this other energy storage system needing to be connected to the same local power supply grid as the energy storage system with the too-low available energy. The energy storage systems according to the invention of a regulating network are all connected to each other via the non-local power supply grid. Only when the non-local power supply grid fails would this no longer be the case. In this case, all energy storage systems affected by this failure represent the original self-sufficient energy storage systems for the supply of local power supply grids. The energy transfer from one energy storage system according to the invention to another local energy storage system according to the invention can be desired specifically when the emitting energy storage system is intended to take up energy soon from a local power supply grid, e.g. for a wind power plant or solar power plant, in the scope of its localized control and system tasks.

In a further embodiment, the energy storage system is provided for guiding the regulating network due to a non-local instruction received via the communication network. The received non-local instruction is, for example, stored in the task memory to the energy storage system provided for guiding and forwarded by the respective regulating unit as leading control unit to the other control units of the other energy storage systems in the regulating network via the communication network. This defines the total control task so that all energy storage systems involved are in a relationship to each other that is defined for the control and system tasks and thus are able to effectively work in the network. In a preferred embodiment, the energy storage system is also intended to take over the control of the regulating network according to the hierarchy, in the case of a hierarchy transmitted over the communication network for the management of the regulating network, if the energy storage system in charge of the control experiences a failure. Thus, the network also has a defined task distribution and in case of failure of the leading control unit, the correspondingly next control unit in the network takes the lead. This hierarchy is for example also stored in the task memory of the control units of the energy storage system of the regulating network.

Furthermore, the invention relates to a method of operating an energy storage system according to the invention connected to a non-local power supply grid for executing non-localized control and system tasks and/or one or more local power supply grids for executing localized control and system tasks with a system storage capacity and a system output with one or more energy storage modules for receiving and supplying energy from/to the connected power supply grids comprising the steps of:

Receiving localized control and system tasks for execution in the connected local power supply grids, Control of receiving or supplying energy to or from the local power supply grid according to the received localized control and system tasks by means of a control unit in the context of a portion of system capacity and/or supplying of the energy storage system intended for local the power supply grid or systems, Receiving non-localized control and system tasks for execution in the connected non-local power supply grid via at least one interface connected to a communication network of the energy storage system and simultaneous control of the receiving and supplying of energy from or into the non-local power supply grid according to the received non-localized control and system tasks in the scope of the portions not required for localized control and system tasks of the system storage capacities and/or system output of the energy storage system.

In one embodiment, the energy storage system is, here, connected to a non-local power supply grid and to one or more local power supply networks. Here, the localized and non-localized control and system tasks in the respective connected power supply grids are carried out separately. In a further embodiment, the energy storage system is only connected to one or more local power supply grids at least one of which is connected to the non-local power supply grid. In this case, the localized control and system tasks are carried out in the respective local power supply grids, while the non-localized control and system tasks are carried out in the non-local power supply grid via the connected local power supply grid that is connected to the non-local power supply grid. In certain operating states, for example, in the event of a failure of one or more power supply grids, an energy storage system can also be completely disconnected from the non-local power supply network. This disconnection may, for example, be limited in time. The same can also apply to the local power supply grid(s).

The term "receive" is understood to mean any type of activity in which data are transmitted to the energy storage system. This transmission can be achieved via the communication network: However, the data can also be received by a data carrier by being read from a corresponding data carrier drive (for example, a CD-ROM) or via a data carrier interface (for example, a USB data stick). Alternatively, the data can also be received by direct input via an appropriate user interface. The data to be received, for example, are the localized and/or non-localized control and system tasks. The system storage capacities and/or system outputs required and not required for the localized control and system tasks can be submitted to a central control unit in the scope of the operating data. In one embodiment, control of the energy storage system is effected by means of the control and system tasks received via the interface and those non-localized control and system tasks stored in a task memory, which are read from the respective control unit and executed as far as possible. The received data can be transmitted over the communication network or otherwise.

In a further embodiment, the method comprises the following further steps:

Measurement of one or more relevant data in each energy storage system connected to the power supply grid by one or more measurement unit(s) of the energy storage system and Control of the energy storage system for localized control and system tasks in this local power supply grid by the control unit based on relevant measured data.

In a further embodiment, the method comprises the following steps:

Checking the received non-localized and localized control and system tasks for plausibility and origin by means of a test unit, Storing the received non-localized and localized control and system tasks in a task memory of the energy storage system in case of a positive test result, The control unit accessing the data stored in the task memory of non-localized and localized control and system tasks for controlling the energy storage system, Priority control of the energy storage system for localized control and system tasks by the control unit according to the non-localized and localized control and system tasks stored in the task memory and Emitting an alarm signal by the test unit to the control unit in case of a negative test result, whereupon the control unit causes a disconnection of the energy storage system from the connected power supply grids.

In a further embodiment, the method comprises the following steps:

Periodically transmitting of a test signal through the energy storage system via the communication network, Receiving a corresponding return signal, with the receiving of the return signal confirming the existing connection to the communication network, Exclusive execution of the localized control and system tasks for the power supply grid(s) by the energy storage system in case of a non-existent connection to the communication network.

Preferably, the energy storage system is adapted to re-establish the connection via an existing alternative sub-communication network existing in the communication network in case of an interrupted connection. To achieve this, the energy storage system comprises several interfaces to sub-communication networks in the communication network. During normal operation with the communication connection being established, all connected power supply grids are therefore taken into account in the control activities. Here, the term "normal operation" refers to operation of the energy storage system with the non-local power supply grid being available and being undisturbed to a large extent.

In a further embodiment, the method comprises the following further step:

Forming a regulating network of the energy storage system with other energy storage systems, which is provided for joint control according to the non-localized control and system tasks in non-local power supply grid or according to regional control and system tasks, with the energy storage system being equipped for communication with the other energy storage systems for carrying out common control.

The forming of a regulating network can, for example, occur due to their respective operating data and the present demand in the non-local power supply grid. Some energy storage systems may fail due to their current or general operating data for a regulating network, for example, due to too-low capacity or lack of black start capability. Preferred non-localized control and system tasks are, e.g., the provision of larger amounts of energy for the non-local power supply grid in a limited region in the non-local power supply grid due to a larger conductor connecting to the non-local power supply grid. Another example of preferential non-localized control and system tasks would be a regulating network for black start support.

The use of individual energy storage systems for a regulating network may take place, for example, due to their respective operating data and the present demand in one or more local power supply grids. Some energy storage systems may fail due to their current or general operating data for a regulating network, for example, due to too-low capacity or an unfavorable geographical position (too high transmission losses). The additional or altered priority control and system tasks may be stored in the task memory so that these tasks are appended to the tasks previously stored and indexed in accordance with conditional or unconditional priority, for example by setting a corresponding mark in the data sets. Here, the task history is maintained for protocol purposes. Alternatively subordinate tasks can be skipped, since their applicability is erased by the priority of other tasks.

SHORT DESCRIPTION OF THE FIGURES

Figure 2:
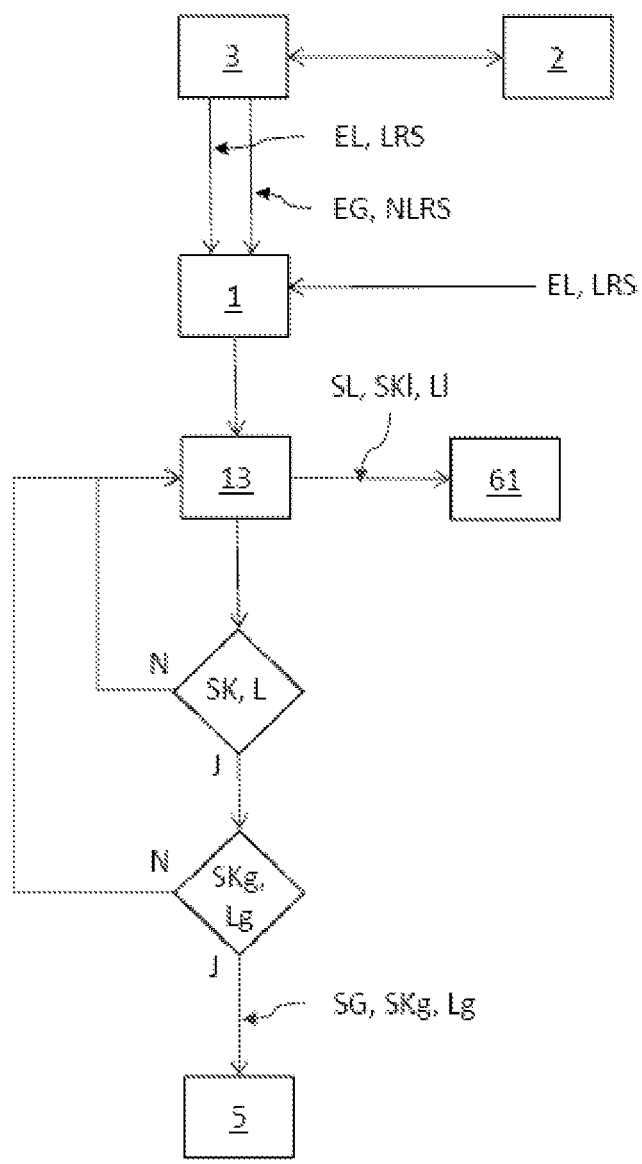
Figure 3:
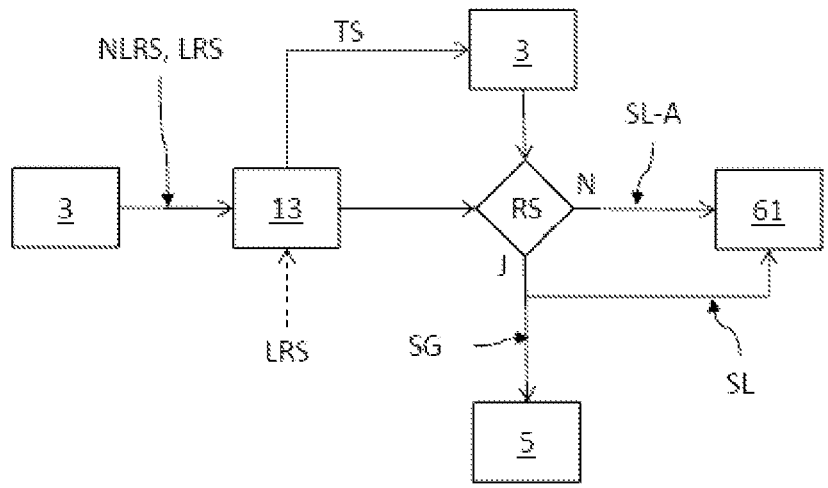
Figure 4:
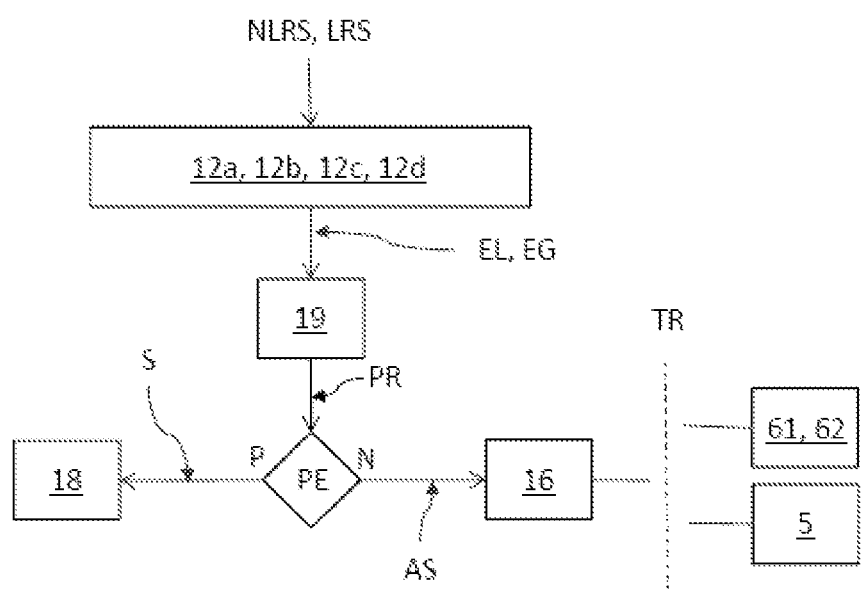
Figure 5:
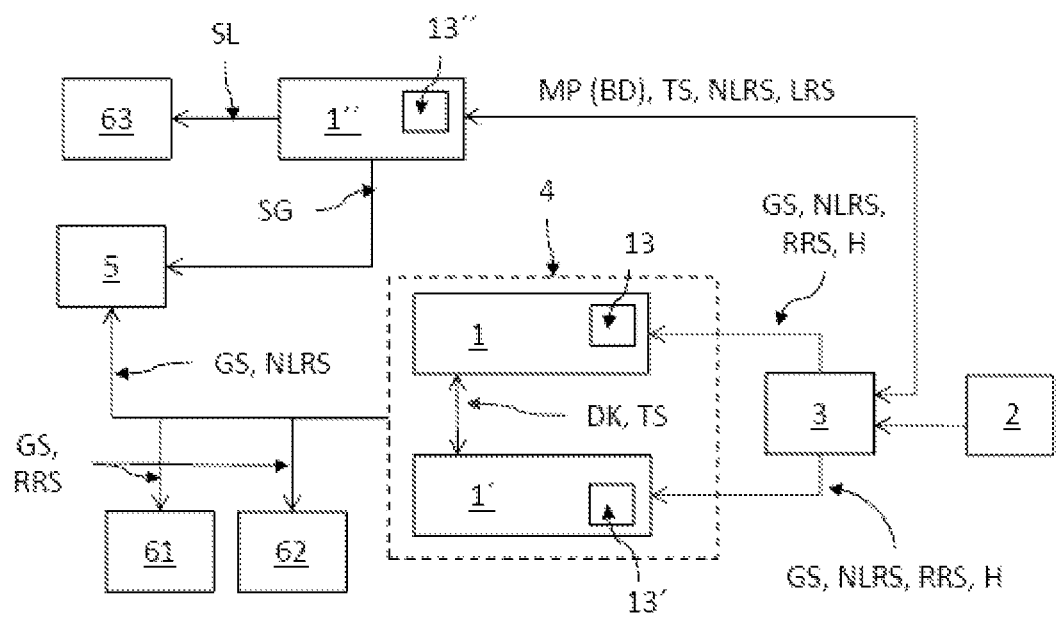
Figure 6:
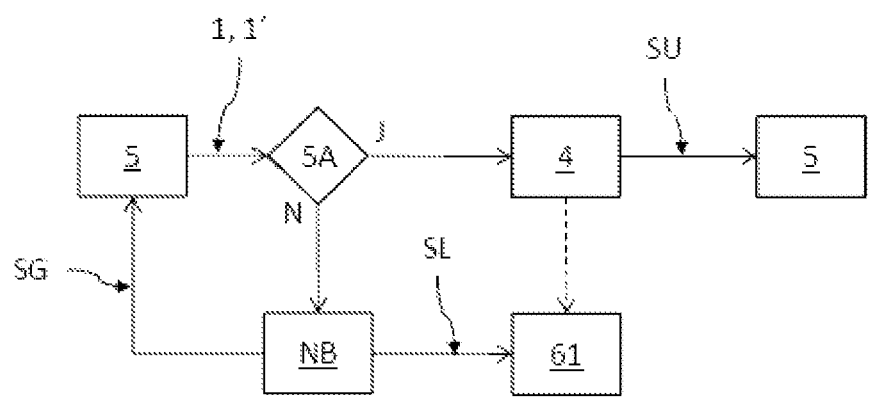
Figure 7:
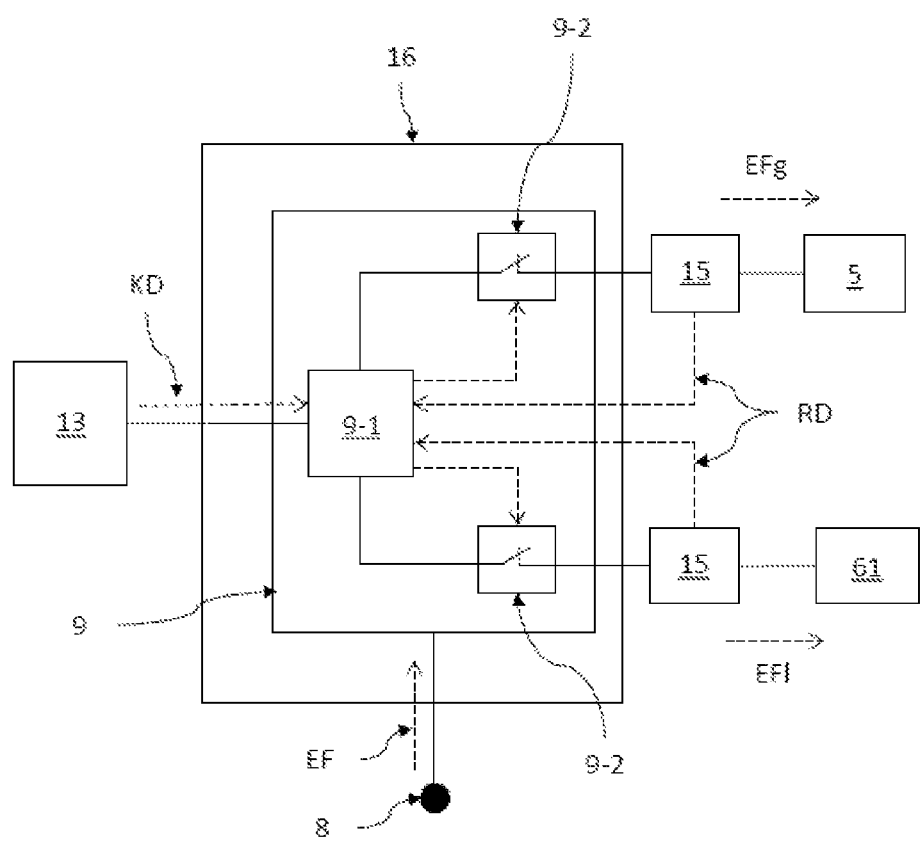

These and other aspects of the invention will be shown in detail in the figures below. In the figures, FIG. 1: shows an exemplary embodiment of an energy storage system according to the invention;

FIG. 2: shows an exemplary embodiment of a method for operating the energy storage system according to the invention;

FIG. 3: shows an exemplary embodiment of the method according to the invention in the event of disturbed communication with the communication network;

FIG. 4: shows an exemplary embodiment of a response of the energy storage system to received control and system tasks of doubtful origin and/or content;

FIG. 5: shows an exemplary embodiment of a regulating network consisting of several energy storage systems according to the invention;

FIG. 6: shows an exemplary embodiment of the method according to the invention in case of failure of the non-local power supply grid;

FIG. 7: shows an exemplary embodiment of the regulating unit with a regulating box

DETAILED DESCRIPTION OF THE EXEMPLARY EMBODIMENTS

FIG. 1 shows an exemplary embodiment of the energy storage system 1 according to the invention. In this embodiment, the energy storage system 1 has three energy storage modules 11 with two flywheel energy storage systems units 14 each for reversible storage of energy per energy storage module 11. The embodiment shown here is only exemplary. The number of energy storage modules 11 per energy storage system 1 depends on the particular application desired and can therefore vary widely. Energy storage systems 1 with only a single energy storage module 11 may also be used. In the illustrated instance, the energy storage modules 11 are connected via a common connection point 8, with the result that their module capacities and module outputs are available in total as the system storage capacity SK and system output L of the energy storage system 1 for control and system tasks NLRS, LRS. In energy storage systems 1 having only one single energy storage module 11, the connection point 8 can also be omitted. Likewise, the number of flywheel energy storage systems 14 in an energy storage module 11 may vary from energy storage module 11 to energy storage module 11 and energy storage system 1 to energy storage system 1. A high number of flywheel energy storage units 14 per energy storage module 11 is to advantage in that it increases the system storage capacity SK and the system output L of the energy storage system 1. The system capacity SK and the system output L is used for receiving En and supplying Ep energy to one or more power supply grids 5, 61, 62 connected to the energy storage system 1. Thereby, the energy storage system 1 shown here is connected to a non-local power supply grid 5 for execution of received non-localized control and system tasks NLRS in the non-local power supply grid 5 and two local power supply grids 61, 62 for execution of received localized control and system tasks LRS in the respective local power supply grids 61, 62. The energy storage system 1 here also comprises three interfaces 12a, 12b, 12c, by means of which it is connected to a communications network 3. In this embodiment, the communication network 3 comprises three sub-communication networks 31, 32, 33, which are, for example, designed as a corded, wireless and power-bound sub-communication networks 31, 32, 33. Accordingly, the three interfaces 12a, 12b, 12c are each responsible for establishing a connection to each of a sub-communication network 31, 32, 33 in the communication network 3. The energy storage system further comprises a fourth interface that can be received on other media or data channels over the data, such as localized control and system tasks stored on a CD-ROM or USB memory. Over the communication network 3 at least the non-localized control and system tasks NLRS are transferred to the energy storage system 1 and received by the same EG. In other embodiments, the localized control and system tasks LRS can be received EL via the communication network 3 by the energy storage system 1. The control unit 13 of the energy storage system 1 controls SL, SG the received En and delivered Ep energy from or to the connected power supply grids 5, 61, 62 according to the localized and non-localized control and system tasks LRS, NLRS simultaneously for the connected power supply grids 5, 61, 62. Here, the non-localized control and system tasks NLRS are executed by the control unit 13 only in the context of the portions SKg, Lg of the system capacities SK and/or system power L, which are not required for localized control and system tasks LRS. In this embodiment, the individual energy storage modules 11 each comprise module control units 11a, 11b, 11c for the operation of the individual energy storage modules 11 and their internal control. The energy storage modules 11 are controlled here jointly by the local control unit 13, with the control unit 13 instructing the individual module control units for executing the control and system tasks via respective data links 7 and the module control units convert the instructions into corresponding machine parameters for the flywheel energy storage systems 14. Alternatively, the module control units 11a, 11b, 11c can be done without and all their functions can also be performed by the control unit 13. The control is effected in that the local control unit 13 tells the individual energy storage modules 11 how much energy is to be released from the flywheel energy storage units 14 by means of deceleration or to be added to the individual flywheel energy storage units 14 by means of acceleration. In order to ensure that this energy collection or release can be achieved as desired, the module control units 11a, 11b, 11c thereupon control the drive motors of the flywheel energy storage units 14 such that they decelerate or accelerate the individual flywheel energy storage units 14. In this embodiment, the energy storage modules 11 are connected via a common connection point 8 with a control unit 16 of the energy storage system 1. This control unit 16 connects the two local power supply grids 61, 62 and the non-local power supply grid 5 with the energy storage system 1, with the control unit 16 splitting the flow of energy EF of the connection point 8 into separate energy flows EFg, EFl to power supply grids 5, 61, 62 connected to the control unit 16 via separate terminals. In addition, the control unit 16 is provided to disconnect one or more of the connected power supply grids 5, 61, 62 from the energy storage system 1, for example, in response to an appropriate disconnection signal from the control unit 13. FIG. 7 shows a possible embodiment of the control unit 16 in detail. For an energy storage system 1, which is only connected to a local power supply grid connected to a non-local power supply grid 5, the control unit comprises at least one circuit breaker. In this case, it is not necessary to split the energy flows EFl and EFg, since the entire flow of energy EF flows into the local power supply grid. The energy storage system 1 further comprises one or more measurement units for measuring one or more relevant data RD (dashed arrows) in the respective, affiliated local and non-local power supply grid 5, 61, 62. The control unit 16 is thereby provided to execute control SL of the energy storage system 1 for the localized control and system tasks LRS in this local power supply grid 61, 62 based on measured relevant data RD. The same applies to the non-local power supply grid 5. Based on the relevant data RD thus measured and therefore available in the energy storage system 1, the control unit 13 may, after having evaluated the relevant data RD and having compared them with the intended localized and non-localized control and system tasks LRS, NLRS, can control the local energy storage system 1 for the localized and non-localized control and system tasks LRS, NLRS in these local and non-local power supply grids 5, 61, 62 in a focused and flexible manner, in order to control the power quality. In order to carry out the control and system tasks, the energy storage system 1 further comprises a task memory 18 that stores S received non-localized and localized control and system tasks NLRS, LRS and which is accessed Z by the control unit 13 for controlling the energy storage system 1 according to the non-localized and localized control or system tasks NLRS, LRS. However, before the received localized and non-localized control and system tasks LRS, NLRS are stored S in the task memory 18, a test unit 19 checks PR the received non-localized and localized control and system tasks NLRS, LRS for plausibility and origin. If the origin is verified and if the received control and system tasks provide meaningful tasks and/or can be fulfilled by the energy storage system 1 with respect to system capacity and system power L, the test unit 19 will send a positive PP test result PE to the task memory 18, so that this memory stores S the received and tested localized and non-localized control and system tasks LRS, NLRS. The control unit 13 may access Z the task memory 18 periodically, for example in the range of milliseconds, or after every storage S in order to detect any new localized and/or non-localized control and system tasks. In case of a negative NP test result PE, the test unit 19 sends an alarm signal AS to the control unit 13, whereupon the control unit 13 disconnects TR the energy storage system 1 from the connected power supply grids 5, 61, 62 via appropriate instruction to the control unit 16. Here, the alarm signal can be sent either directly or via a data connection through the task memory 18 to the control unit 13. The transmission through the task memory 18 is of advantage in that the task memory 18 becomes aware of the negative NP test result PE without an additional signal being sent by the test unit 19, and actively rejects the storage of the localized or non-localized control and system tasks LRS, NLRS tested negative in response. In this embodiment, the control unit 13 further checks the existing connection to the communication network 3 by means of a periodically emitted test signal TS, on receipt of which a corresponding return signal RS is received via the communication network 3. Receiving the return signal RS confirms the existing connection to the communication network 3. Test signal TS and return signal RS are also known as the so-called digital handshake, in which one side sends a data packet, which is answered characteristically by reception on the other side. After receiving the response, the existence of the communication link is tested positively for the sending side. Alternatively, the digital handshake can also be initiated by an external system and answered by the energy storage system 1 with a corresponding return signal RS. The control unit 13 can be adapted in case of an interrupted connection along one of the sub-communication networks 31, 32, 33, to reestablish this connection over an alternative sub-communication network 31, 32, 33 inside the communication network 3. With the connection being established via the communication network 3, the control unit 13 is configured to send out the previously detected and evaluated operating data BD of the energy storage system 1 by itself in a message log MP comprising these operating data BD via the communication network 3, so that the operating data BD can be considered at least for the non-localized control and system tasks NLRS. The consideration of the data in the message log with at least the operating data is effected in an external control unit 2 that is responsible for the production of non-localized control and system tasks for the associated energy storage systems 1, 1', 1" according to the invention (see FIG. 5) and its transmission to this energy storage system 1, 1', 1" via the communication network 3.

The embodiment of the energy storage system 1 shown in FIG. 1 can, for example, also comprise one or more weather sensors 17 for measuring local weather conditions WB, with the control unit 13 being provided to control operating components of the energy storage system 1 depending on weather conditions WB. Operating components refer to all components of the energy storage modules 11, for example, auxiliary units such as chillers, vacuum plants, etc. Such operating components are affected by weather conditions WB. When temperatures are high outside, for example, a cooling unit must be operated with more power than at low outside temperatures. If the energy storage modules 11 provide power to operate the operating components themselves, this must be considered when planning future non-localized and localized control and system tasks NLRS, LRS. A higher outside temperature would reduce the available system storage capacity SK and system output L for tasks in the connected power supply grids 5, 61, 62. In this respect, measuring weather data enables a better anticipating and hence more effective use of the energy storage system 1.

FIG. 2 shows an exemplary embodiment of a method for operating the energy storage system according to the invention 1. The energy storage system 1 receives EG, EL non-local and/or localized control and system tasks NLRS, LRS via the communication network 3 for example from a suitable external control unit 2. The localized control and system tasks can be alternatively or additionally received through other channels of data from the energy storage system 1 as well. On the basis of the received localized and non-localized control and system tasks LRS, NLRS, the control unit 13 checks the feasibility of the received localized and non-localized control and system tasks in the system storage capacity SK and system power L of the energy storage system 1. If the localized control and system tasks can be carried out, they will be carried out by a preferential control SL in a connected local power supply grid 61 with a required local system capacity SKL and a local system power Ll. The non-localized control and system tasks are checked for their general feasibility within the scope of the system storage capacity SK and system power L. If an execution is generally not possible, because the received non-localized control and system tasks exceed the scope of the energy storage system 1, the control unit 13 emits a corresponding error signal via the communication network 3 and blocks these non-localized control and system tasks so that they cannot be carried out again. Since the localized control and system tasks are carried out, only the non-local system capacity SKg and system power Lg which are not required for the localized control and system tasks are available to the non-localized control and system tasks. Even if non-localized control and system tasks NORS can, in principle, be carried out by the energy storage system 1, it is now checked whether these tasks can in fact be carried out within the scope of the free non-local capacities SKg and free non-local output Lg. If the check shows that it is currently not possible to carry out the non-localized control and system tasks NLRS, these tasks are shelved for being carried out by the control unit 13 and, for example, appropriately labeled in the task memory 18. If the check shows that it is currently possible to carry out the non-localized control and system tasks NLRS, the control unit 7M controls SG the energy storage system 1 such that the non-localized control and system tasks NLRS can be fulfilled (carried out) in the connected non-local power supply grid 5. To achieve this, the regulating unit 16 receives the appropriate instructions from the control unit 13 via an appropriate data connection 31 on the control and splitting of the energy flow EF into an energy flow EFg to/from the non-local power supply grid 5 and an energy flow EFl to/from the local power supply grid 61.

FIG. 3 shows an exemplary embodiment of the method according to the invention in the event of a disturbed connection to the communication network 3. During a communication connection, non-localized control and system tasks NLRS were transmitted to the energy storage system 1 via the communication network 3 and received by EC; they were then stored in the task memory 18, as already shown in FIG. 1. If the local control unit 13 accesses this task memory 18 now, it will also be tested whether the energy storage system 1 is still connected to the communication network 3. If the check shows that a communication connection is established ("J"), for example, by an above-described digital handshake with transmission of a test signal TS to the communication network 3 and the receipt of a return signal RS (RS="J"), the energy storage system 1 will, with priority, carry out SL the localized control and system tasks LRS for the connected local power supply grid 61 (in the embodiment shown here, only one local power supply grid is connected) and in the context of free non-local capacities SKg and free non-local output Lg non-localized control and system tasks for the non-local power supply grid 5 will be carried out SG as well. If the check of the communication connection is negative (RS="N"), only the localized control and system tasks LRS are exclusively for the local power supply grid 61 are carried out. A periodic check of the communication link at a later time can cause a check to be positive again (RS="J"), so that the energy storage system 1 carries out localized and non-localized control and system tasks LRS, NLRS within the available capacity and output SK SKG, SKL, L, Lg, Ll in parallel again.

FIG. 4 shows an exemplary embodiment of a response of the energy storage system 1 to received localized and/or non-localized control and system tasks LRS, NLRS of doubtful origin and/or doubtful content. Here localized and non-localized control and system tasks LRS, NLRS are received EG, EL via one or more interfaces 12a, 12b, 12c, 12d of the energy storage system 1 and forwarded to the test unit 19. There, a test PR of the received EL, EG non-localized and localized control and system tasks NLRS, LRS for plausibility and origin takes place. To achieve this, the test unit 19 comprises an appropriate program with a test routine which is automatically applied to every received localized or non-localized control and system task LRS, NLRS. If the test result PP is positive PE (PE=PP), the received EL, EG localized and non-localized control and system tasks NLRS, LRS are stored S in the task memory 18 of the energy storage system 1. The control and system tasks that are allowed to be stored S can, for example, be appropriately indexed by the test unit (for example, a set bit or any other marker). In this case, the task memory 18 stores only those control and system tasks that are indexed accordingly. Alternatively, the test unit 19 can also transfer only those control and system tasks that have been tested positively PP to the task memory 18. In this case, the control and system tasks do not have to be marked or indexed because control and system tasks that have been tested negatively are not transferred by the test unit and, therefore, the task memory does not have to assume the task of detecting the test result PE. In a further alternative embodiment, the test unit can file the tested control and system tasks in a buffer, for example, in the test unit 19 and send to the task memory 18 a data list of the positively PP tested control and system tasks, whereupon the task memory 18 automatically downloads the positively PP tested control and system tasks from the buffer and stores them in the task memory 18. The control unit 13 can access Z localized and non-localized control and system tasks stored in the task memory 18, using a data connection for the execution. The stored localized control and system tasks are executed simultaneously, but primarily before the non-localized control and system tasks. It is always possible to carry out the tasks simultaneously provided both control and system tasks can be carried out within the scope of the system storage capacity and the system output. If this is not the case, the localized control and system tasks are carried out with priority. If, in contrast, the test result PE is negative (PE=N), the test unit 19 sends out an alarm signal AS to the control unit 13, whereupon the control unit 13 initiates a disconnection TR of the energy storage system 1 from the connected power supply grids 5, 61, 62. This completed disconnection TR is schematically indicated by the dashed vertical line between the regulating unit 16 and the power supply grids 5, 61, 62.

FIG. 5 shows an embodiment of a regulating network 4 with several energy storage systems 1, 1' according to the invention. Here the energy storage systems 1, 1', 1" with the control units 13, 13', 13" are all intended to form a regulating network 4 with other energy storage systems, which are suitable or intended as regulating network 4 for a common control GS according to the non-localized control or system tasks NLRs in the non-localized power supply grid 5 or according to regional control and system tasks RRS in one or more local power supply grids 61, 62 due to external instructions. In this embodiment the energy storage systems 1, 1' form a regulating network 4, with the energy storage systems 1, 1' being connected to the local power supply grids 61, 62 as well as to the non-local power supply grid 5. The energy storage system 1" is not part of the regulating network 4 and is connected to both the non-local power supply grid 5 as well as to the local power supply grid 63 and is operated as described in FIG. 1. The energy storage systems 1, 1' in a regulating network 4 are provided and intended for direct communication DK with the respective energy storage systems 1, 1' of the regulating network 4 for the implementation of common control GS. The direct communication DK can also take place via the communication network 3. In the regional network 4, the energy storage systems 1, 1' can also execute additional or changed priority localized control and system tasks as regional control and system tasks RRS for execution in the regional power supply grids 61, 62. In the embodiment shown here, the energy storage systems 1, 1' of the regulating network 4 communicate directly via the communication network 3 to perform non-localized regulating or system tasks NLRs and/or regional control and system tasks RRS. Alternatively, the energy storage system 1, 1' can receive an instruction from outside (for example from an external control unit 2) via the communication network 3 to form a control network 4. Here, a hierarchy H of control units 13, 13' of energy storage systems 1, 1' can be received for guiding the regulating network 4, together with the instruction to form a regulating network 4. Based on the hierarchy H in case of failure of the control unit in charge of the control 13 of the energy storage system 1, the control unit 13' of the energy storage system 1' following in the hierarchy H can take control of the regulating network 4.

FIG. 6 shows an exemplary embodiment of the method according to the invention in the event of a failure 5A of the non-local power supply grid 5. In this embodiment, a regulating network 4 was created previously from several energy storage systems 1, which is ready for black start support SU if the non-local power supply grid 5 fails 5A. The energy storage systems 1 continuously check whether the non-local power supply grid 5 is present, for example, via the appropriate regulating unit 16. If the check shows that the non-local power supply grid 5 is present (5A=N), the energy storage systems 1 are continued to be operated in normal operating mode (as shown in FIG. 1) with the result that the energy storage systems 1 are controlled SL, SG according to the localized and non-localized control and system tasks LRS, NLRS. If the check shows that the non-local power supply grid 5 has failed (5A=J), the black start supporting unit SU for the non-local power supply grid 5 is given priority over the localized control and system tasks LRS (indicated by the dashed arrow pointing to the local power supply grid 61). The local energy storage systems in the regulating network 4 will perform a black start for the non-local power supply grid 5 after or with the corresponding synchronization of the infeed frequency together. Once the black start has been successfully performed, the localized control and system tasks LRS are performed with precedence.

FIG. 7 shows an exemplary embodiment of the regulating unit 16 which, in the illustrated instance, is connected to a local power supply grid 61 and to a non-local power supply grid 5. In order that the regulating unit 16 can regulate the energy flow EF between the connected power supply grids 5, 61 and the energy storage system 1 and, if necessary, disconnect one or more of the connected power supply grid, i.e. the local power supply grid 61 and/or the non-local power supply grid 5 in the illustrated instance, from the local energy storage system 1, the regulating unit 16 according to this embodiment comprises a regulating box 9 having a control element 9-1 and separate circuit breakers 9-2 for each of the connected power supply grids 5, 61. The local control unit 13 is connected to the control element 9-1 of the regulating box 9 via a data connection 31 and transmits appropriate configuration data of the regulating function KD to the regulating box 9, i.e. the control box 9-1 in the illustrated instance, for controlling the energy flows. Based on the configuration data of the regulating function KD, the control element 9-1 controls the splitting of the energy flow EF coming in from the connection point 8 to the connected power supply grids 5, 61 into the energy flow EFl for the local power supply grid 61 and the energy flow EFg for the non-local power supply grid 5. In this exemplary embodiment, the distribution of the energy flow EF is shown when energy is fed into both connected power supply grids 5, 61 by way of example only. Similarly, the regulating box 9 is configured to control an energy flow from one of the connected power supply grids 5, 61 and an energy flow to the other one of the connected power supply grids 61, 5 wherein, depending on the size of the two energy flows, either the negative energy excess of the energy storage system 1 is stored or the positive energy excess of the energy storage system 1 is provided. In the illustrated instance, the energy storage system 1 is not shown explicitly but only symbolically through the corresponding components 13, 15, 16. The regulating box 9 simultaneously receives the relevant data RD of the two connected power supply grids 5, 61 from corresponding measuring units 15 wherein, based on said relevant data RD, the control element 9-1 derives the presence of the two connected power supply grids 5, 61 by means of criteria or threshold values for the relevant data RD that are filed in the control element 9-1. If one of either of the connected power supply grids 5, 61 is no longer available because of a network failure, the failure of the particular power supply grid 5, 61 manifests itself in the corresponding relevant data RD transmitted to the control element 9-1, whereupon the control element 9-1 automatically sends appropriate disconnection instructions (dashed arrow) to the respective circuit breaker(s) 9-2 for disconnection of the energy storage system 1 from the connected power supply grid(s) 5, 61, whereupon the circuit breaker(s) 9-2 disconnect(s) the previously connected power supply grid(s) 5, 61 from the energy storage system 1. Therein, the connected power supply grid is disconnected within a few milliseconds. If only one power supply grid is disconnected, the energy storage system 1 continues to be ready for the other still connected power supply grids. As a result, a short-circuit or overload situation can effectively be prevented in the event of a power supply grid. The exemplary embodiment shown here with a connected local power supply grid 61 and a connected non-local power supply grid 5 is only an example for two connected power supply grids. In other embodiments, the regulating unit 16, more particularly the regulating box 9, can also be connected to more than two power supply grids. The two or more connected power supply grids may also each be local power supply grids of which at least one of the local power supply grids is connected to the non-local power supply grid for execution of the non-localized control and system tasks.

The embodiments shown here represent only examples of the present invention and may therefore not be understood to be limiting. Alternative embodiments that can be contemplated by the person skilled in the art are likewise included in the scope of the present invention.

LIST OF REFERENCE SYMBOLS

1 energy storage system according to the invention
1', 1" additional energy storage systems according to the invention
11 energy storage module of the energy storage systems
11a, 11b, 11c module control unit of individual energy storage modules
12a, 12b, 12c interfaces of the energy storage system for a communication network
12d interfaces of the energy storage system referring to other data carriers
13 control unit of the energy storage system
14 flywheel energy storage unit
15 measuring unit of the energy storage system
16 regulating unit for connecting the energy storage system to the power supply grids
17 weather sensor
18 task storage of the energy storage system
19 test unit
2 external control unit
3 communication network
31 corded sub-communication network
32 radio-linked sub-communication networks
33 current-linked sub-communication networks
4 regulating network of several energy storage systems
5 non-local power supply grid
5A failure of the non-local power supply grid
61, 62, 63 local power supply grid
7 data connection
8 connection point
9 regulating box
9-1 control element
9-2 circuit breaker
AS alarm signal
BD operating data of the local energy storage system
DK direct communication between energy storage systems in a regulating network
EF energy flow
EFG energy flow to the non-local power supply grid
EFL energy flow to the local power supply grid
EC taking up non-localized control and system tasks
EL taking up localized control and system tasks
En taking up energy from the power supply grid by the energy storage system (provision of negative energy)
Ep emitting energy into the power supply grid by the energy storage system (provision of positive energy)
H hierarchy of control in the regulating network or regional network
HS checking the existence of the communication link
KD configuration data of the regulating function
L system output of the energy storage system (total output)
Lg system output available for the non-localized control and system tasks (non-local output)
Ll system output provided for the localized control and system tasks (local output)
LRS localized control and system tasks
MP message log
NP negative test result
NB normal operation
NLRS non-localized control and control tasks
PP positive test result
PE test result
PR checking the received NLRS, LRS
RD relevant data of the local power supply grid
RRS regional control and system tasks
RS return signal in response to the test signal
S storing the received NLRS, LRS
SG controlling the respective local energy storage system for non-localized control and system tasks
SK system storage capacity of the energy storage system (total capacity)
SKg system storage capacity available for the non-localized control and system tasks (non-local capacity)
SKl system storage capacity provided for the localized control and system tasks (local capacity)
SL controlling the respective local energy storage system for localized control and system tasks SL-A exclusive control of the respective local energy storage system for localized control and system tasks
SU black start supporting unit
TR disconnecting the energy storage system from the connected power supply grids
TS test signal
WB weather conditions
Z The master control unit accessing the task memory

The invention claimed is:

1. An energy storage system with at least one energy storage module and a system storage capacity and system output for receiving and supplying energy to/from the power supply grids connected to the energy storage system, wherein the energy storage system is at least intended for connection to a non-local power supply grid for the execution of received, non-localized control and system tasks in the non-local power supply grid and for connection to one or more local power supply grids for the execution of received, localized control and system tasks in the local power supply grid(s) and is adapted to be connected to a communication network via at least one interface and to receive at least the non-localized control and system tasks via the communication network, and comprises a control unit, which is adapted to carry out control tasks of receiving and supplying energy from or to the connected power supply grids according to the localized and non-localized control and system tasks simultaneously for all connected power supply grids, wherein the control unit is adapted to control the non-localized control and system tasks only in the scope of the portions of the system storage capacities and/or system output, which are not required for localized control and system tasks, wherein the energy storage system is provided to periodically send out a test signal via the communication network and to receive a corresponding return signal, with the receiving of the return signal confirming the existing connection to the communication network.

2. The energy storage system according to claim 1, characterized in that the energy storage module comprises one or more flywheel energy storage systems for the reversible storage of energy within the energy storage system.

3. The energy storage system according to claim 1, characterized in that the energy storage system comprises more than one energy storage modules, each of the energy storage module comprises a module control unit to execute tasks assigned to the individual energy storage modules by the control unit via respective data links in the context of localized and non-localized control and system tasks.

4. The energy storage system according to claim 1, characterized in that the energy storage system is provided to form a regulating network with other energy storage systems used as regulating network for a common control according to the non-localized control or system tasks in the non-localized power supply grid or according to regional control and system tasks in one or more local power supply grids, and characterized in that the energy storage system is adapted to carry out the common control for communication with the other energy storage systems.

5. The energy storage system according to claim 1, characterized in that the energy storage system comprises one or more measuring units for measuring one or more data in the connected local power supply grid and that the control unit is provided for controlling the energy storage system for the localized control and system tasks in this local power supply grid based on the measured data.

6. The energy storage system according to claim 1, characterized in that the energy storage system is connected to the one or more local power supply grids and the non-local power supply grid, with the control unit being adapted to control an energy flow between the connected power supply grids and the energy storage system, where the control unit is also provided to disconnect one or more of the connected power supply grids from the energy storage system if necessary.

7. The energy storage system according to claim 1, characterized in that the energy storage system comprises several interfaces to sub-communication networks in the communication network and is adapted to restore the connection via an alternative sub-communication network in the existing communications network, in the case of an interrupted connection.

8. The energy storage system according to claim 1, characterized in that the energy storage system is provided for the respective local power supply grid(s) during a non-existent connection to the communication network for the exclusive implementation of the localized control and system tasks.

9. The energy storage system according to claim 1, characterized in that the energy storage system comprises a task memory for storing the received non-localized and localized control and system tasks, which is accessed by the control unit for controlling the energy storage system according to the non-localized and localized control or system tasks.

10. The energy storage system according to claim 9, characterized in that the energy storage system comprises a test unit which is intended to verify received non-localized and localized control and system tasks for plausibility and origin before saving in the task memory, and storage in the task memory only takes place in case of a positive test result.

11. The energy storage system according to claim 10, characterized in that the test unit is adapted to emit an alarm signal to the control unit in case of a negative test result, and the control unit is adapted to disconnect the energy storage system from the connected power supply grids following the alarm signal.

12. The energy storage system according to claim 1, characterized in that the control unit is adapted to detect and evaluate operating data of the energy storage system and to send out a message log comprising the operating data via the communications network, so that at least the operating data to be received for the non-localized control and system tasks can be considered.

13. A method of operating an energy storage system connected to a non-local power supply grid to execute non-localized control and system tasks and/or to one or more local power supply grids to execute localized control and system tasks with a system storage capacity and a system output according to claim 1 with one or more energy storage modules for receiving and supplying of energy from/to the connected power supply grids comprising the steps of:

Receiving localized control and system tasks for execution in the connected local power supply grids, Controlling the receiving and supplying of energy to or from the local power supply grid according to the received localized control and system tasks by means of a control unit as part of a portion provided for the local power supply grid(s) of the system storage capacity and/or system output of the energy storage system, Receiving at least non-localized control and system tasks for execution in the connected non-local power supply grid via at least one interface of the energy storage system connected with a communication network, and simultaneous control of the receiving and supplying of energy from or into the non-local power supply grid according to the received non-localized control and system tasks in the scope of the portions not required for localized control and system tasks of the system storage capacities and/or system output of the energy storage system, sending out a test signal periodically by the energy storage system via the communication network and receiving a corresponding return signal, with the receiving of the return signal confirming the existing connection to the communication network.

14. The method according to claim 13 comprising the further steps of:
checking received non-localized and localized control and system tasks by means of a test unit for plausibility and origin,
saving the received non-localized and localized control and system tasks in a task memory of the energy storage system in case of a positive test result,
the local control unit accessing the non-localized and localized control and system tasks stored on the task memory to control the energy storage system,
priority control of the energy storage system for localized control and system tasks through the control unit according to the non-localized and localized control and system tasks stored in the task memory, and
emitting an alarm signal by the test unit to the control unit in case of a negative test result, whereupon the control unit causes a disconnection of the energy storage system from the connected power supply grids.

15. An energy storage system with at least one energy storage module and a system storage capacity and system output for receiving and supplying energy to/from the power supply grids connected to the energy storage system, wherein the energy storage system is at least intended for connection to a non-local power supply grid for the execution of received, non-localized control and system tasks in the non-local power supply grid and for connection to one or more local power supply grids for the execution of received, localized control and system tasks in the local power supply grid(s) and is adapted to be connected to a communication network via at least one interface and to receive at least the non-localized control and system tasks via the communication network, and comprises a control unit, which is adapted to carry out control tasks of receiving and supplying energy from or to the connected power supply grids according to the localized and non-localized control and system tasks simultaneously for all connected power supply grids, wherein the control unit is adapted to control the non-localized control and system tasks only in the scope of the portions of the system storage capacities and/or system output, which are not required for localized control and system tasks, wherein the energy storage system comprises a task memory for storing the received non-localized and localized control and system tasks, which is accessed by the control unit for controlling the energy storage system according to the non-localized and localized control or system tasks.

16. The energy storage system according to claim 15, characterized in that the energy storage system comprises a test unit which is intended to verify received non-localized and localized control and system tasks for plausibility and origin before saving in the task memory, and storage in the task memory only takes place in case of a positive test result.

17. An energy storage system with at least one energy storage module and a system storage capacity and system output for receiving and supplying energy to/from the power supply grids connected to the energy storage system, wherein the energy storage system is at least intended for connection to a non-local power supply grid for the execution of received, non-localized control and system tasks in the non-local power supply grid and for connection to one or more local power supply grids for the execution of received, localized control and system tasks in the local power supply grid(s) and is adapted to be connected to a communication network via at least one interface and to receive at least the non-localized control and system tasks via the communication network, and comprises a control unit, which is adapted to carry out control tasks of receiving and supplying energy from or to the connected power supply grids according to the localized and non-localized control and system tasks simultaneously for all connected power supply grids, wherein the control unit is adapted to control the non-localized control and system tasks only in the scope of the portions of the system storage capacities and/or system output, which are not required for localized control and system tasks, wherein the control unit is adapted to detect and evaluate operating data of the energy storage system and to send out a message log comprising the operating data via the communications network, so that at least the operating data to be received for the non-localized control and system tasks can be considered.

18. A method of operating an energy storage system connected to a non-local power supply grid to execute non-localized control and system tasks and/or to one or more local power supply grids to execute localized control and system tasks with a system storage capacity and a system output according to claim 1 with one or more energy storage modules for receiving and supplying of energy from/to the connected power supply grids comprising the steps of:
Receiving localized control and system tasks for execution in the connected local power supply grids,
Controlling the receiving and supplying of energy to or from the local power supply grid according to the received localized control and system tasks by means of a control unit as part of a portion provided for the local power supply grid(s) of the system storage capacity and/or system output of the energy storage system,
Receiving at least non-localized control and system tasks for execution in the connected non-local power supply grid via at least one interface of the energy storage system connected with a communication network, and
simultaneous control of the receiving and supplying of energy from or into the non-local power supply grid according to the received non-localized control and system tasks in the scope of the portions not required for localized control and system tasks of the system storage capacities and/or system output of the energy storage system,
checking received non-localized and localized control and system tasks by means of a test unit for plausibility and origin,
saving the received non-localized and localized control and system tasks in a task memory of the energy storage system in case of a positive test result,
the local control unit accessing the non-localized and localized control and system tasks stored on the task memory to control the energy storage system,
priority control of the energy storage system for localized control and system tasks through the control unit according to the non-localized and localized control and system tasks stored in the task memory, and
emitting an alarm signal by the test unit to the control unit in case of a negative test result, whereupon the control unit causes a disconnection of the energy storage system from the connected power supply grids.

* * * * *